US011188593B1

(12) United States Patent
Hale et al.

(10) Patent No.: US 11,188,593 B1
(45) Date of Patent: Nov. 30, 2021

(54) REACTIVE PROGRAMMING DATABASE INTERFACE

(71) Applicant: Pivotal Software, Inc., San Francisco, CA (US)

(72) Inventors: Joseph Benjamin Hale, Corte Madera, CA (US); Oliver Drotbohm, Dresden (DE); Stéphane Adrien Joseph Maldini, San Francisco, CA (US)

(73) Assignee: Pivotal Software, Inc., San Francisco, CA (US)

( * ) Notice: Subject to any disclaimer, the term of this patent is extended or adjusted under 35 U.S.C. 154(b) by 125 days.

(21) Appl. No.: 16/235,493

(22) Filed: Dec. 28, 2018

(51) Int. Cl.
*G06F 16/903* (2019.01)
*G06F 9/48* (2006.01)
*G06F 9/50* (2006.01)
*G06F 16/9038* (2019.01)

(52) U.S. Cl.
CPC ...... *G06F 16/90335* (2019.01); *G06F 9/4843* (2013.01); *G06F 9/5005* (2013.01); *G06F 16/9038* (2019.01)

(58) Field of Classification Search
CPC ............. G06F 16/90335; G06F 9/4843; G06F 9/5005; G06F 16/9038
See application file for complete search history.

(56) References Cited

U.S. PATENT DOCUMENTS

| 5,819,255 A | 10/1998 | Celis et al. |
| 6,606,626 B1 | 8/2003 | Ponnekanti |
| 7,139,749 B2 | 11/2006 | Bossman et al. |

(Continued)

FOREIGN PATENT DOCUMENTS

CA    2883883 A1 * 3/2014 ............ G06Q 30/08

OTHER PUBLICATIONS

Docs.spring.io [online] "23. Web Reactive Framework: Part V. The Web," retrieved on Mar. 26, 2019, retrieved from: https://docs.spring.io/spring-framework/docs/5.0.0.M1/sprine-framework-reference/html/web-reactive.html, 5 pages.

(Continued)

*Primary Examiner* — Ashish Thomas
*Assistant Examiner* — Yohanes D Kelemework
(74) *Attorney, Agent, or Firm* — Fish & Richardson P.C.

(57) ABSTRACT

Methods, systems, and apparatus, including computer programs encoded on computer storage media, for implementing a reactive database query retrieval system. One of the methods includes receiving a request to execute a query, obtaining a plurality of reactive programming operators including a database connection operator, a query operator, and a query results operator; evaluating the operators in the upstream subscription flow ordering until evaluating the database connection operator; allocating a first thread to execute the database connection operator to request a database connection; executing the database connection operator using the first thread to request a database connection; relinquishing computing resources for the first thread before the database management system responds to the request for the connection; receiving an indication that the database management system has provided a database connection; and in response, allocating a second thread to execute a query operator to provide the query to the database management system.

20 Claims, 4 Drawing Sheets

(56) References Cited

U.S. PATENT DOCUMENTS

| | | | |
|---|---|---|---|
| 9,400,638 | B2 | 7/2016 | Smet et al. |
| 9,600,501 | B1* | 3/2017 | Fuller ................... G06F 16/27 |
| 2005/0071841 | A1* | 3/2005 | Hoflehner ............... G06F 8/441 |
| | | | 718/100 |
| 2005/0108710 | A1* | 5/2005 | Patiejunas ............... H04L 29/06 |
| | | | 718/100 |
| 2012/0047495 | A1 | 2/2012 | Meijer et al. |
| 2012/0084749 | A1 | 4/2012 | Gogh et al. |
| 2012/0330917 | A1* | 12/2012 | Wei ..................... G06F 16/2365 |
| | | | 707/703 |
| 2016/0306714 | A1* | 10/2016 | De Smet ............. G06F 11/1469 |
| 2018/0246911 | A1* | 8/2018 | Lee ........................ G06F 16/21 |
| 2018/0322168 | A1* | 11/2018 | Levine ................ G06F 16/2448 |
| 2018/0357291 | A1* | 12/2018 | Choi ................... G06F 16/2379 |

OTHER PUBLICATIONS

Github.com [online] "High performance reactive Postgres Client written in Java," year 2019, [retrieved on Mar. 26, 2019], retrieved from: https://github.com/reactiverse/reactive-pg-client, 7 pages.

Jdbi.org [online] Jdbi 3 Developer Guide, dated Jan. 22, 2019 [retrieved on Mar. 26, 2019], retrieved from: http://jdbi.org/, 126 pages.

Maldini, "Reactor Netty," Asynchronous TCP, UDP and HTTP, dated Mar. 26, 2019, 9 pages.

Postgresql.org [online] Chapter 51. Frontend/Backend Protocol, dated Feb. 14, 2019 [retrieved on Mar. 26, 2019], retrieved from: https://www.postgresql.org/docs/9.6/protocol.html, 2 pages.

Projectreactor.io [online] Reactor Core 3.2.8.RELEASE, retrieved on Mar. 26, 2019, retrieved from: https://projectreactor.io/docs/core/release/api/, 2 pages.

R2dbc.io [online] R2DBC: Clients, year 2018, [retrieved on Mar. 26, 2019], retrieved from: https://r2dbc.io/clients/, 4 pages.

* cited by examiner

REACTIVE PROGRAMMING DATABASE INTERFACE

BACKGROUND

This specification relates to database management systems.

A database management system (DBMS) is a software system that maintains a database having one or more relations. Part of the database management system services requests from client applications to access and query the database.

The typical information flow for a client application querying a database proceeds as follows. First, a client application sends a request to the DBMS to open a connection. The DBMS will then respond to the client application to indicate that the DBMS is ready for a query. Upon successfully opening a connection, the client application can send a query to the DBMS.

The DBMS can send a notification to the client application that the query has been successfully received. In addition, depending on its complexity, the DBMS may first perform one or more query optimization processes to generate a query plan for the received query. When complete, the DBMS can then notify the client application that query optimization is complete. If the original query had one or more variables in it, the client application then provides values for the variables in the query.

The DBMS will then execute the query to obtain query results for the query. The DBMS will then begin sending query results to the client application. The DBMS can stream the results to the client application as they are generated, can send the results in batches, or can send the results as one large result set.

During each of these interactions, the software of the client application blocks to wait for the DBMS to respond. In this example, there are several points in time that require the client application to block, for example: while waiting for the DBMS to open the connection, while waiting for the DBMS to receive the query, while waiting for the DBMS to perform query optimization, and while waiting for the DBMS to provide query results.

During these blocking operations, the application occupies at least one thread of the underlying computing environment while doing no actual work. A common thread utilization strategy on multicore processors is to dedicate one core to each thread. Therefore, when one thread is blocking, the utilization of the processor is hindered.

Therefore, the blocking nature of these interactions makes the number of threads supported by the computing environment a bottleneck that limits the number of client applications that can concurrently access a DBMS. These performance and scalability bottlenecks grow worse as the database grows larger and the queries become more complex. For example, although opening a connection may take only a few milliseconds, executing a query can take minutes at a time if the DBMS manages a modern, massively parallel distributed database.

SUMMARY

This specification describes how a reactive database query retrieval system receives queries from a reactive programming application and interfaces with a database management system to retrieve query results for the reactive programming application. The reactive query retrieval system handles database connecting, database querying, query optimization, and query result retrieval in a non-blocking and asynchronous manner, consistent with a reactive programming paradigm.

In general, one innovative aspect of the subject matter described in this specification can be embodied in methods including the actions of receiving, from a client application, a request to execute a query on a database management system that maintains a database having one or more relations; obtaining a plurality of reactive programming operators that implement an interface into the database management system, the operators comprising: a database connection operator that when executed is configured to request a connection to the database, a query operator that when executed is configured to provide a query to the database management system, and a query result operator that when executed is configured to process one or more query results received from the database; evaluating the reactive programming operators in the upstream subscription flow ordering until evaluating the database connection operator; allocating a first thread to execute the database connection operator to request a connection to the database; executing the database connection operator using the first thread to request a connection to the database; relinquishing computing resources for the first thread before the database management system responds to the request for the connection; receiving an indication that the database management system has provided a connection to the database; in response, allocating a second thread to execute the query operator to provide the query to the database management system; executing the query operator using the second thread to provide the query to the database; relinquishing computing resources for the second thread before the database management system acknowledges receiving the query; receiving an indication that the database management system has provided one or more first query results for the query; in response, allocating a third thread to execute the query result operator to process the one or more first query results for the query; and executing the query result operator using the third thread to process the one or more first query results for the query. Other embodiments of this aspect include corresponding computer systems apparatus, and computer programs recorded on one or more computer storage devices, each configured to perform the actions of the methods.

The foregoing and other embodiments can each optionally include one or more of the following features, alone or in combination. In particular, one embodiment includes all the following features in combination.

Optionally, the database management system is configured to provide query results for the query in a plurality of batches including a first batch comprising the one or more first query results and wherein relinquishing computing resources for the third thread after processing the one or more first query results for the query; receiving an indication that the database management system has provided a second batch comprising one or more second query results for the query; in response, allocating a fourth thread to execute the query result operator to process the one or more second query results for the query; and executing the query result operator using the fourth thread to process the one or more second query results for the query.

Optionally, the database management system is configured to perform a query optimization process on the query and to provide a notification to the client application when the query optimization process is complete and wherein relinquishing computing resources for the second thread before the database management system acknowledges receiving the query comprises relinquishing the computing resources for the second thread before the database management system has completed the query optimization process.

Optionally, the plurality of reactive programming operators further comprises a second query operator that when executed is configured to provide a second query to the database management system and the query optimization process comprises: allocating a third thread to execute the second query operator to provide the second query in the database management system, before executing the query operator using the second thread to provide the query to the database; executing the second query operator using the third thread to provide the second query to the database; and relinquishing computing resources for the third thread before the database management system acknowledges receiving the second query.

Optionally, the client application is configured to concurrently maintain more than ten thousand threads having connections to the database.

Optionally, the client application is configured to concurrently maintain a fixed number of threads, each thread associated with computing resources from one or more computers.

Optionally, an allocated thread is a thread that has been previously allocated to execute an operator from the plurality of reactive programming operators and the computing resources for the allocated thread have been previously relinquished.

Particular embodiments of the subject matter described in this specification can be implemented so as to realize one or more of the following advantages.

The reactive database query retrieval system allows reactive programming applications to interact with databases, where previously this was not possible because of the traditional programming paradigm of concurrent interactions with a database in a blocking manner. Additionally, the system makes database retrieval for a reactive programming application possible because the system does not require thread local variables for each allocated thread for executing a operator related to database querying, e.g., for establishing a connection, querying the database, optimizing the query, or retrieving query results. Additionally, the system can allocate threads for each operator related to database querying to execute asynchronously.

Computing resources allocated to threads can be aggressively relinquished to prevent idle computing resources, because the system relinquishes resources without blocking until the system receives an indication from the database management system. For example, the system relinquishes resources allocated to establish a database connection with a database, before receiving an indication from the database management system that a connection has been established. Relinquished computing resources can then be allocated to execute another operator, either related to the query to the database that prompted the database connection, or related to a different query altogether.

For reactive programming applications allocating threads representing computing resources for one or more computer processing cores, the system can run the cores at full utilization, because the threads are non-blocking. For queries resulting in a large set of query results, e.g., a set of 1 million records, the system can return the query results in subsets of a pre-determined size, providing subsets when possible to the reactive programming application instead of blocking a thread until all of the data for a query is available. Returning the query results in subsets of a pre-determined size also ensures that the source of the query requests, e.g., a client application, is not overloaded with too much data received at once, which may otherwise reduce performance.

Additionally, the system can handle a large number of concurrent threads, e.g., 65536 threads, without requiring the reactive programming application to make substantive decisions about how the threads are allocated, or how the system performs query optimization using available computing resources. The system performs query optimization automatically.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how a reactive programming application can query a database and receive query results in a non-blocking, asynchronous environment. A database querying retrieval system can manage a plurality of threads for establishing a database connection, querying a database, and receiving query results from the database, in response to a plurality of reactive programming operators executed by the database querying retrieval system.

Reactive programming is an asynchronous programming paradigm that is focused on data streams and the propagation of change. Therefore, in a reactive programming language it is possible to express static, e.g. arrays, or dynamic, e.g. event emitters, data streams by simply declaring variables having appropriate types. A reactive programming program can include one or more subscriber operators, that when executed, subscribe to a respective one or more publisher operators. Upon subscription, the one or more publisher operators begin to emit data for use in the reactive programming program.

The semantics of reactive programs have a number of important features.

First, the statements of a reactive program define a sequence of operators. The sequence of operators starts with a publisher operator and ends with a subscriber operator. The ordering of the sequence of operators in the program will be referred to as the downstream order.

However, when the reactive program is actually executed, the operators are first executed in an upstream phase in upstream order, e.g., in a direction that is opposite to the downstream order defined by the program.

In the upstream phase, each operator in the program notifies the preceding operator that it is ready to begin receiving data. Each operator can also optionally write to a subscription context in the upstream phase that propagates some data upstream during the upstream phase.

The downstream phase begins after the publisher operator receives a notification that the subsequent operator in the sequence is ready to begin receiving data. During the downstream phase, each operator receives events from a preceding operator in the sequence, processes the events, and provides the processed events to a subsequent operator in the sequence.

Importantly, the semantics of a reactive program imply non-blocking operation between the boundaries of the operators in the sequence. In other words, operations of adjacent operators in the sequence can be, and indeed are expected to be, handled by different threads in the underlying execution system. The threads that implement the operators generally do not maintain any state between the operators.

This arrangement provides a primary advantage of reactive programming paradigms, which is asynchronous and non-blocking execution. This means that a single thread can be used to process multiple asynchronous sequences that execute at roughly the same time, so that that execution often jumps from one thread to another. In other words, rather than threads blocking to wait for acknowledgement or completion by the operators, execution is allowed to switch to another active task using the same underlying resources and later come back to the previous process when the asynchronous processing has completed.

In a reactive programming paradigm, thread boundaries are no longer obeyed. In a blocking programming paradigm, each thread can store its own copy of a local variable. For example, in Java, threads can make use of ThreadLocal variables to store local copies of data.

In contrast, in a reactive programming system, the thread is not owned by the program currently being executed, and thus the thread can be switched to execute operators of other program instances at any time. This means that thread boundaries no longer provide stability for storing information locally in association with a single thread.

The property of not respecting thread boundaries can be exploited to implement a reactive database query retrieval system that is non-blocking and asynchronous. This is an important feature for modern online applications that can have hundreds or thousands of concurrent users.

Instead, with a reactive database querying retrieval system, the threads do not block, and the same thread resources can be continually reassigned while waiting for an indication that the operators executed on the threads have completed, e.g., a database connection has been established, or a database has received a query. Therefore, an online application that requires communicating with a database can be implemented as a reactive programming application, where previously this was not possible because traditional models handled database querying in a blocking manner.

Figure 1:
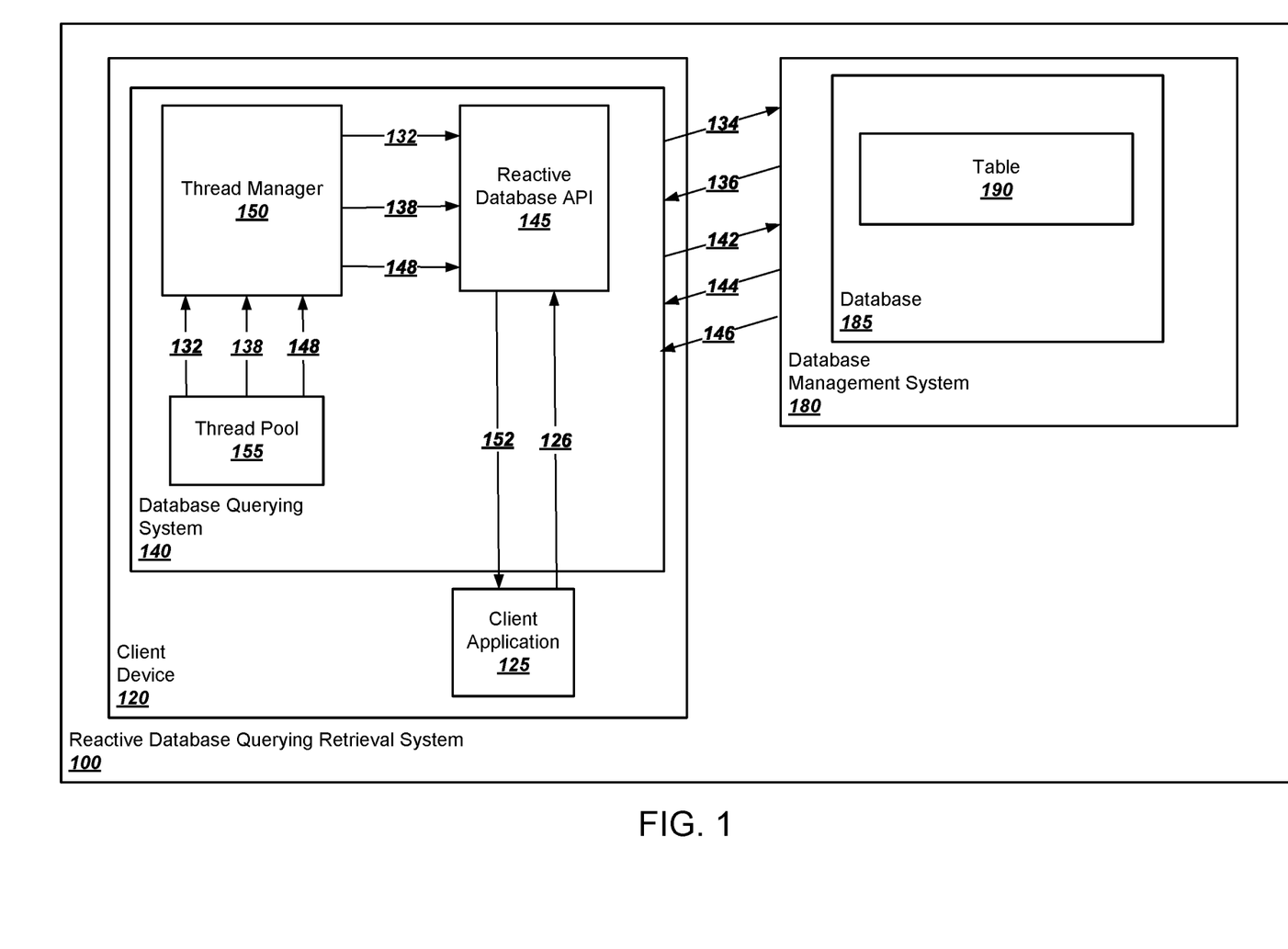
FIG. 1 is a diagram of a reactive database querying retrieval system that illustrates a client device communicating with a database management system through a database querying system.

FIG. 1 is a diagram of a reactive database querying retrieval system 100 that illustrates a client device 120 communicating with a database management system 180 through a database querying system 140. Although illustrated as a separate system in FIG. 1, the database management system 180 can also be installed on the client device 120 and can be part of the database querying system 140.

The client device 120, e.g., a mobile device or a terminal, can execute a client application 125, e.g., a web application that makes use of a reactive database application program interface (API) 145, through the database querying system 140. The database querying system 140 provides a runtime environment for a client application, e.g. a client application 125. The client application 125 can include operators for establishing a database connection, querying a database 185, and obtaining results for that query. In particular, the client application 125 can send a query 126 for the database 185 to the database querying system 140.

The database querying system 140 can include the reactive database application program interface (API) 145. The database querying system can handle routines in the client application 125, defined by the reactive database API 145. For example, the reactive database API 145 can have a function for sending a query to a database, which takes as a parameter the query 126 sent by the client application 125. The reactive database API 145 can also define routines for: establishing a database connection with the database 185, optimizing a query, and receiving query results from the database 185. A detailed discussion of the database querying system 140 follows, below.

A routine defined in the reactive database API 145 can include executing several sub-routines that perform discrete tasks for optimizing the steps of sending the query 126 to the database management system 180 and receiving one or more processed query results 152. The database querying system 140 abstracts the sub-routines executed after receiving the query 126 from the client application 125, so that the client application 125 can send queries and receive query results without the client application 125 specifying the sub-routines. As discussed below, the sub-routines can include operators for allocating computing resources to one or more threads, and relinquishing the computing resources for the one or more threads.

Allocating computing resources to a particular thread refers to designating some or all of a computing resource available to the system, e.g., one or more processors, processor cores, co-processors, or special-purpose processors, for the exclusive use of executing the operator for the particular thread. Relinquishing the computing resources for a thread refers to making computing resources that were previously allocated by the thread available again for use by the system. For example, if the system allocated a processor core to a first thread, then that processor core is not available to the system until the processor is subsequently relinquished. Once the processor core is relinquished, the processor core can be used, for example, in allocating computing resources for a second thread.

The database querying system 140 can include a thread manager 150 and a thread pool 155. The thread manager 150 can allocate computing resources as threads in the database querying system 140, based on computing resources available in the thread pool 155. The thread manager 150 can also relinquish computing resources previously allocated as threads in the database querying system 140.

Prior to receiving the query 126 to the database 185 from the client application 125, the database querying system 140 can generate a plurality of reactive programming operators using the reactive database API 145. Reactive programming operators, when executed, are configured to perform one of several tasks.

For example, one reactive programming operator is a database connection operator, which when executed, is configured to request from the database management system 180 a connection to the database 185. Another reactive programming operator is a query operator, which when executed, is configured to provide the query 126 to the database management system 180 for the database 185. In some implementations, the query operator additionally executes operators for optimizing the query before querying the database 185. Another reactive programming operator is a query result operator, which when executed, is configured to process one or more query results 152 from the database management system 180 for the database 185.

The plurality of reactive programming operators generated by the database querying system 140 includes a database connection operator, a query operator, and a query result operator. After generating the plurality of reactive programming operators, the database querying system 140 can receive the query 126 to the database 185 from the client application 125.

Following the receipt of the query 126, the database querying system 140 evaluates the reactive programming operators in the upstream subscription flow ordering until the database querying system 140 evaluates the database connection operator. In response, the thread manager 150 allocates a first thread 132 from the thread pool 155 to execute the database connector operator. A description of the upstream subscription flow for a reactive programming program is discussed, below.

The database querying system 140 executes the database connection operator to request a database connection 134 from the database management system 180. In response and after some period of time, the database management system 180 establishes a database connection and sends an indication 136 to the database querying system 140 that the database connection has been established. However, before the database querying system 140 receives the indication 136, the thread manager 150 relinquishes computing resources for the first thread 132.

After the database querying system 140 receives the indication 136 that the connection to the database 185 has been established, the thread manager 150 allocates a second thread 138 from the thread pool 155 to execute the query operator. The database querying system 140 executes the query operator to send the query 126 (shown as line connector 142 in FIG. 1) to the database management system 180 to query the database 185. After some period of time, the database management system 180 sends a notification 144 to the database querying system 140 confirming that the query 126 has been received. However, before the database querying system 140 receives the notification 144, the thread manager 150 relinquishes computing resources for the second thread 138.

The database management system 180 receives the query 126 and provides, from the database 185, one or more query results 146. A result can be one or more records from a table 190 in the database 185, and can also be an empty record, indicating that no records matching the query 126 were found in the database 185. The database management system 180 sends the one or more query results 146 to the database querying system 140.

In response to receiving one or more query results 146, the thread manager 150 allocates a third thread 148 from the thread pool 155 to execute the query results operator. The database querying system 140 executes the query results operator to process the one or more query results 146 for the query 126 to obtain processed query results 152. The processed query results 152 are passed to the client application 125 for additional processing, or as input to other operations, e.g., the client application 125 can display the process query results to a user via a user interface.

Figure 2:
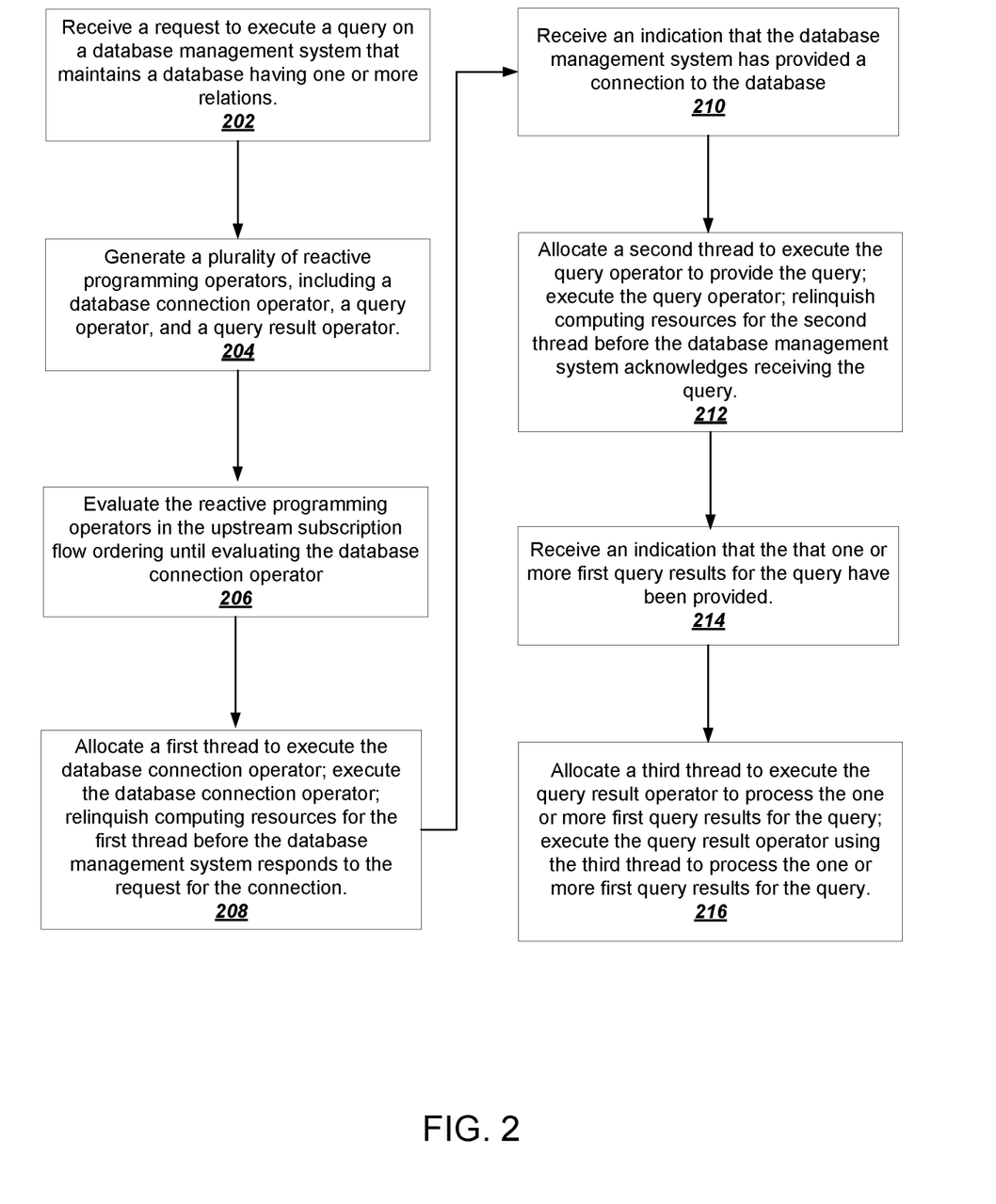
FIG. 2 is a flowchart for an example process for executing a query to a database and receiving query results, using a reactive database query retrieval system.

FIG. 2 is a flowchart for an example process for executing a query to a database and receiving query results, using a reactive database query retrieval system. For convenience, the process in FIG. 2 will be described as being performed by a system of one or more computers located in one or more locations. For example, a reactive database querying retrieval system, e.g., the reactive database querying retrieval system 100 of FIG. 1, appropriately programmed in accordance with this specification, can perform the process in FIG. 2. Additional detail for implementing a system that can perform the process in FIG. 2 can be found in the description of FIG. 1, above.

The system receives, by a client application, a request to execute a query on a database management system that maintains a database having one or more relations (202). In some implementations, the system receives a plurality of requests to execute multiple queries, by the client application. The system can receive the plurality of requests in batches, or the system can receive the requests as they are made by the client application.

The system obtains a plurality of reactive programming operators that implement an interface into the database management system (204). As discussed above with reference to FIG. 1, the reactive programming operators can include a database connection operator, a query operator, and a query result operator. In some implementations, the system additionally generates a query optimization operator that requests the database management system to optimize one or more queries from the client application before executing the one or more queries. In some implementations, the system can generate a plurality of query operators, e.g., in response to receiving a plurality of queries by the client application. For each query operator, the system can generate a respective query result operator for the query.

The system evaluates the reactive programming operators in the upstream subscription flow ordering until evaluating the database connection operator (206). The system can implicitly generate a subscription operator, that when executed, causes the system to evaluate the reactive programming operators in the upstream subscription flow ordering until evaluating the database connection operator. In this specification, the database connection operator is a publisher. In response to (i) the subscription operator subscribing to the database connection operator and (ii) the system evaluating the database connection operator, the system can allocate a thread to execute the database connection operator. A discussion of the reactive programming ordering and the upstream subscription flow follows in reference to FIG. 3A and FIG. 3B, below.

The system executes step 208 of the process in FIG. 2. As discussed above in reference to FIG. 1, the system: allocates a first thread to execute the database connection operator to request a connection to the database; executes the database connection operator using the first thread to request a connection to the database; and relinquishes computing resources for the first thread before the database management system responds to the request for the connection.

The system receives an indication that the database management system has provided a connection to the database (210). The database connection to the database can persist indefinitely, or be set to expire based on a condition, e.g., after a certain period of time. In some implementations, the database connection operator, when executed by the system, checks to see if a database connection has already been established. If a database connection has already been established, the system can receive an indication that the database management system has provided a connection to the database.

In response to receiving an indication that the database management system has provided a connection to the database, the system can execute step 212 of the process in FIG. 2. As discussed above in reference to FIG. 1, the system: allocates a second thread to execute the query operator to provide the query to the database management system; executes the query operator using the second thread to provide the query to the database; and relinquishes computing resources for the second thread before the database management system acknowledges receiving the query.

In some implementations where the plurality of reactive programming operators includes a plurality of query operators, the system can repeat step 212 of process in FIG. 2 for each respective query operator. Specifically, the system can, for each query operator: allocate a respective thread to execute the query operator; execute the query operator using the respective thread, and relinquish computing resources for the respective thread before the database management acknowledges receiving the respective query for the query operator.

In some implementations, the system performs query optimization on the query prior to providing the query to the database. The system can be configured to perform a query optimization process to optimize queries sent to the database, e.g., to maximize available computing resources and reduce response time to receive query results for a query by the database management system. The system can also be configured to provide an indication to the client application when the query optimization process is complete. In some implementations, the system can additionally relinquish computing resources for the second thread before receiving an indication that the query optimization process is complete. By doing so, the system aggressively keeps computing resources available, while a traditional database querying system executing a query optimization process may block the executing thread until receiving an indication that the process is complete.

Additionally, if the plurality of reactive programming operators includes a plurality of query operators, the system can, for each query operator, relinquish the respective query operator for the query operator before receiving an indication that the query optimization process is complete.

The system receives an indication that the database management system has provided one or more query results for the query (214). If the system generated a plurality of query operators, then the system generates a plurality of query result operators, where each query result operator corresponds to a respective query operator.

In some implementations, the system provides query results for the query by first dividing the query results into a plurality of batches of a pre-determined size. For example, the system can divide the one or more query results into discrete batches. Alternatively, if the system executes more than one query to the database in parallel, the query results for a respective query can be divided into separate batches. In some implementations, the system can further divide each batch for a respective query into smaller sub-batches, e.g., if the batch for a set of query results exceeds a pre-determined size.

In response to receiving an indication that the database management system has provided one or more first query results for the query, the system executes step 216 of the process in FIG. 2. As discussed above in reference to FIG. 1, the system: allocates a third thread to execute the query result operator to process the one or more query results for the query; and executes the query result operator using the third thread to process the one or more query results for the query.

In implementations where query results are first divided into batches, the system can allocate computing resources for additional threads to execute the query result operator for each batch of query results. For example, the system can, after executing the query result operator using the third thread to process the one or more query results for the query, relinquish computing resources for the third thread. The system can receive an indication that the database management system has provided a second batch of one or more query results. In response, the system can allocate a fourth thread to execute the query result operator to process the one or more query results in the second batch. The system can repeat this process for each remaining batch.

Next, a discussion of the reactive programming operator ordering and the upstream subscription ordering for the reactive programming operators is presented. As discussed above, a reactive database querying retrieval system can generate a plurality of reactive programming operators. The plurality of reactive programming operators defines an ordering of one or more operators, which the system can iterate over twice in opposite directions.

An upstream ordering of the operators from a subscriber to a publisher represents a subscription flow through the operators for a particular subscriber. A downstream ordering of operators represents a data flow through the operators that propagates data from a particular publisher to a particular subscriber.

The publisher is the database connection operator in the plurality of reactive programming operators. The system can generate an additional operator to act as the subscriber in addition to generating the plurality of reactive programming operators. Alternatively, one of the operators in the plurality of reactive programming operators can be the subscriber. The system generally executes the upstream subscription flow first, followed by the downstream data flow.

Figure 3A:
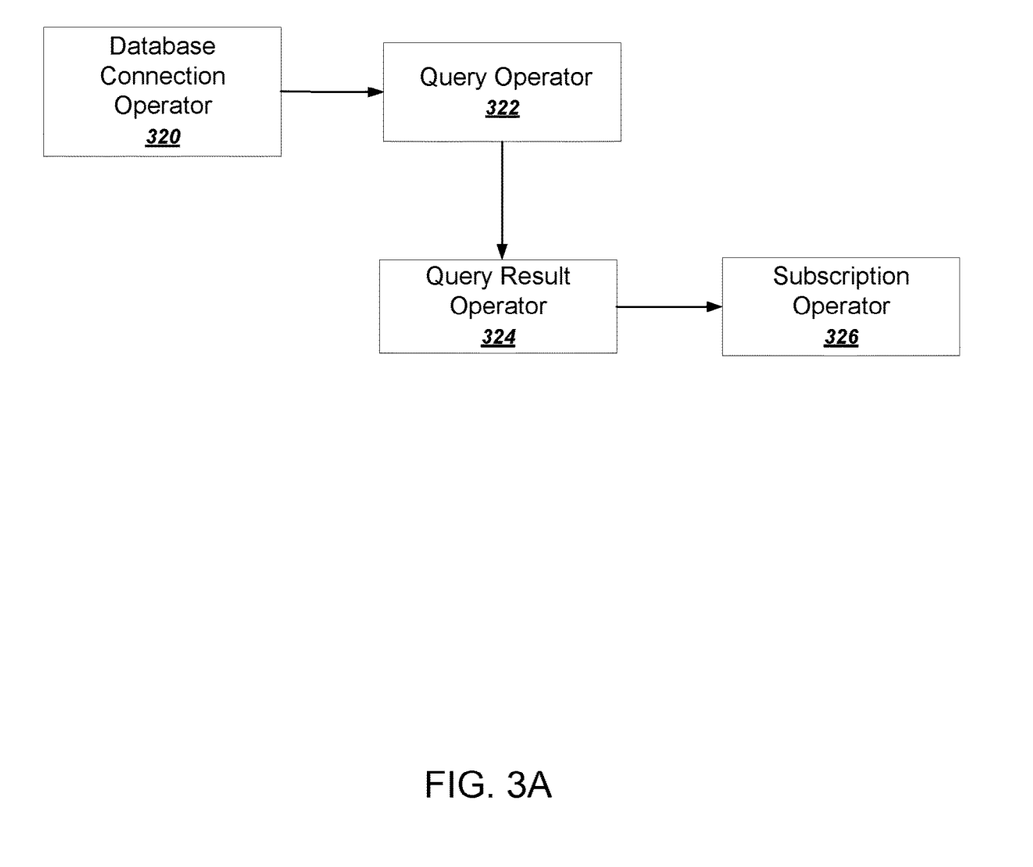
FIG. 3A is a diagram that illustrates a reactive programming operator ordering.

FIG. 3A is a diagram that illustrates reactive programming operators generated by a reactive database query retrieval system, defining an ordering. The ordering shown in FIG. 3A can be defined by the system, but generally follows a sequential order of operators needed to query a database and receive query results. Specifically, a database connection operator 320 is ordered before a query operator 322, which is ordered before a respective query result operator 324. The database connection operator 320 is the first reactive programming operator in the ordering, and a subscription operator 326 is the last operator in the ordering.

While not shown in FIG. 3A, as discussed above, the reactive programming operators can include a plurality of query operators and a corresponding plurality of query result operators. In that case, the reactive programming operators defines an ordering where, for each query operator having a corresponding query result operator, the query operator is ordered before the corresponding query result operator. Additionally, the reactive programming operators can include a query optimization operator. The query optimization operator is ordered after one or more query operators in the ordering defined by the reactive programming operators.

The database connection operator 320 acts as the publisher in the ordering shown in FIG. 3A. The database connection operator 320, when executed by the system, can establish a database connection and begin to emit data from the database. The database connection operator 320 only begins to emit data after receiving a subscription request from a subscriber. The subscription operator 326 defines the subscriber for the database connection operator 320. The subscription operator 326 starts the entire upstream subscription process and defines a receiving operator for the downstream data flow process.

Figure 3B:
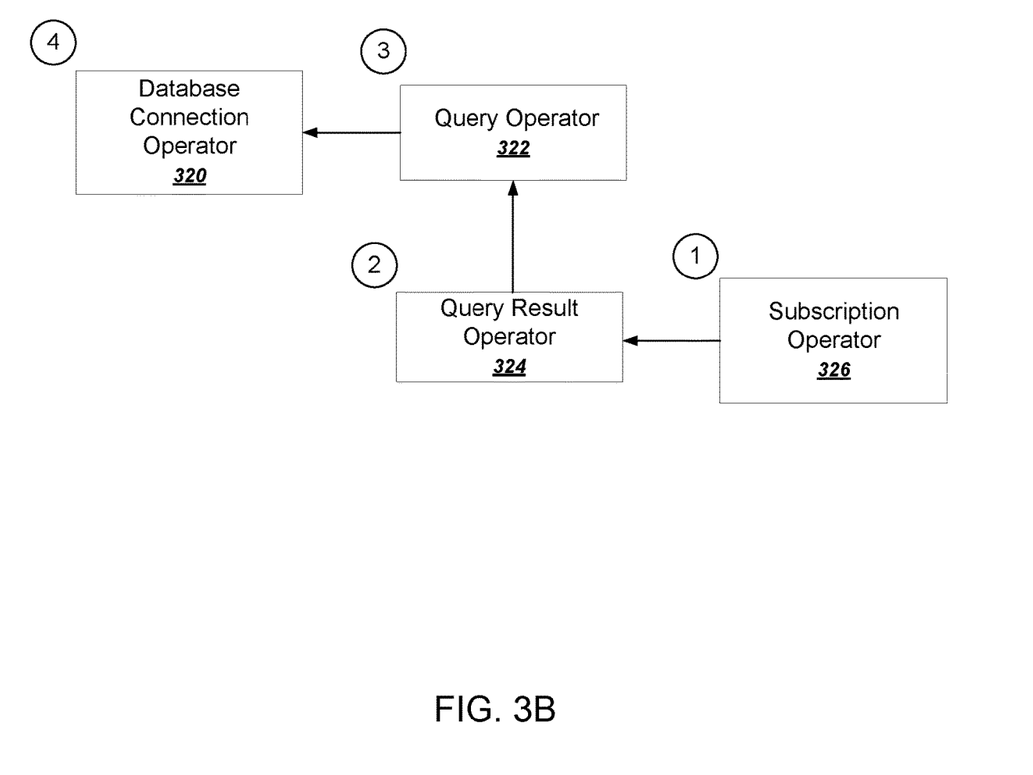
FIG. 3B is a diagram that illustrates the upstream subscription flow of a reactive programming ordering.

FIG. 3B is a diagram that illustrates the upstream subscription flow of a reactive programming operator ordering. The system evaluates the reactive programming operators in the upstream subscription flow ordering, beginning with the subscription operator 326. The system evaluates the ordering for each reactive programming operator in the upstream subscription flow until the database connection operator 320 is evaluated.

The system performs the following operations in the upstream subscription flow: a subscription operation of the query result operator 324 so that the query result operator 324 is subscribed to the query operator 322; and a subscription operation of the query operator 322 so that the query operator 322 is subscribed to the database connection operator 320.

The subscription operation "subscribes" one operator to another, so that in the downward data flow process, each operator provides data to the operator that is subscribed to it. For example, because the query operator 322 is subscribed to the database connection operator 320, data from the database connection 320 "flows", e.g., is provided to, the query operator 322. The same is true for the query result operator 324, subscribed to the query operator 322.

TABLE 1 illustrates an example of source code in a reactive programming client application for querying a database. For clarity and ease of understanding, the source code of the example below is written at the level of an application intended to be used in a reactive programming application that automatically provides some of the low level functionality, including the subscriber operator that actually initiates the upstream subscription flow. Therefore, some functionality of the reactive database querying retrieval systems described in this specification are not represented by the statements in the source code example below.

TABLE 1

```
1    connectionFactory.create ()
2      .flatMapMany(conn ->
3        conn.createStatement("SELECT value FROM table")
4          .execute( )
5          .flatMap(result ->
6            result.map((row, metadata) -> row.get("value"))))
```

Line 1, when executed, creates a database connection. The database connection operator acts as the publisher, so that while a subscriber is subscribed to the database connection operator, the publisher will emit data. On lines 2-3, a query is prepared. Line 4, when executed, executes the query created on lines 2-3 to the database. On lines 5-6, the results of the query are mapped to a plurality of rows, depending on how many results were returned. The database connection operator can emit a stream of data, representing multiple results from the query.

In this example, the system generates a subscriber operator to subscribe to the database connection operator. During the upstream subscription flow, the system evaluates the operators in the upstream order, until evaluating line 1, as described above. Once the database connection operator receives a notification that the subsequent operator is ready to begin receive data, the system executes the operators in the downstream phase.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A reactive database query retrieval system comprising:
one or more databases; and
a database querying system, the database querying system comprising:
one or more computers, and one or more storage devices storing instructions that are operable, when executed by the one or more computers, to cause the one or more computers to perform operations comprising:
receiving, from a client application, a request to execute a query on a database management system that maintains a database having one or more relations;
obtaining a plurality of reactive programming operators that implement an interface into the database management system, the operators comprising:
  a database connection operator that when executed is configured to request a connection to the database,
  a query operator that when executed is configured to provide a query to the database management system, and
  a query result operator that when executed is configured to process one or more query results received from the database;
executing a reactive program to asynchronously, and without blocking, query and receive query results from the database management system, the executing comprising:
  evaluating the reactive programming operators in the upstream subscription flow ordering until evaluating the database connection operator;
  allocating a first thread to execute the database connection operator to request a connection to the database;
  executing the database connection operator using the first thread to request a connection to the database;
  relinquishing computing resources for the first thread before the database management system responds to the request for the connection;
  receiving an indication that the database management system has provided a connection to the database;
  in response, allocating a second thread to execute the query operator to provide the query to the database management system;
  executing the query operator using the second thread to provide the query to the database;
  relinquishing computing resources for the second thread before the database management system acknowledges receiving the query;
  receiving an indication that the database management system has provided one or more first query results for the query;
  in response, allocating a third thread to execute the query result operator to process the one or more first query results for the query; and
  executing the query result operator using the third thread to process the one or more first query results for the query.

2. The system of claim 1, wherein the database management system is configured to provide query results for the query in a plurality of batches including a first batch comprising the one or more first query results, and wherein the operations further comprise:
  relinquishing computing resources for the third thread after processing the one or more first query results for the query;
  receiving an indication that the database management system has provided a second batch comprising one or more second query results for the query;
  in response, allocating a fourth thread to execute the query result operator to process the one or more second query results for the query; and
  executing the query result operator using the fourth thread to process the one or more second query results for the query.

3. The system of claim 1, wherein the database management system is configured to perform a query optimization process on the query and to provide a notification to the client application when the query optimization process is complete, and wherein relinquishing computing resources for the second thread before the database management system acknowledges receiving the query comprises relinquishing the computing resources for the second thread before the database management system has completed the query optimization process.

4. The system of claim 3, wherein the plurality of reactive programming operators further comprises a second query operator that when executed is configured to provide a second query to the database management system, and the query optimization process comprises:
  allocating a third thread to execute the second query operator to provide the second query in the database management system, before executing the query operator using the second thread to provide the query to the database;
  executing the second query operator using the third thread to provide the second query to the database; and
  relinquishing computing resources for the third thread before the database management system acknowledges receiving the second query.

5. The system of claim 1, wherein the client application is configured to concurrently maintain more than ten thousand threads having connections to the database.

6. The system of claim 1, wherein the client application is configured to concurrently maintain a fixed number of threads, each thread associated with computing resources from one or more computers.

7. The system of claim 1, wherein an allocated thread is a thread that has been previously allocated to execute an operator from the plurality of reactive programming operators and the computing resources for the allocated thread have been previously relinquished.

8. A computer program product, encoded on one or more non-transitory computer storage media, comprising instructions that when executed by a database querying system comprising one or more computers causes the database querying system to perform operations comprising:
  receiving, from a client application, a request to execute a query on a database management system that maintains a database having one or more relations;
  obtaining a plurality of reactive programming operators that implement an interface into the database management system, the operators comprising:
    a database connection operator that when executed is configured to request a connection to the database,
    a query operator that when executed is configured to provide a query to the database management system, and
    a query result operator that when executed is configured to process one or more query results received from the database;
  executing a reactive program to asynchronously, and without blocking, query and receive query results from the database management system, the executing comprising:
    evaluating the reactive programming operators in the upstream subscription flow ordering until evaluating the database connection operator;
    allocating a first thread to execute the database connection operator to request a connection to the database;

executing the database connection operator using the first thread to request a connection to the database;

relinquishing computing resources for the first thread before the database management system responds to the request for the connection;

receiving an indication that the database management system has provided a connection to the database;

in response, allocating a second thread to execute the query operator to provide the query to the database management system;

executing the query operator using the second thread to provide the query to the database;

relinquishing computing resources for the second thread before the database management system acknowledges receiving the query;

receiving an indication that the database management system has provided one or more first query results for the query;

in response, allocating a third thread to execute the query result operator to process the one or more first query results for the query; and executing the query result operator using the third thread to process the one or more first query results for the query.

9. The computer program product of claim 8, wherein the database management system is configured to provide query results for the query in a plurality of batches including a first batch comprising the one or more first query results, and wherein the operations further comprise:

relinquishing computing resources for the third thread after processing the one or more first query results for the query;

receiving an indication that the database management system has provided a second batch comprising one or more second query results for the query;

in response, allocating a fourth thread to execute the query result operator to process the one or more second query results for the query; and executing the query result operator using the fourth thread to process the one or more second query results for the query.

10. The computer program product of claim 8, wherein the database management system is configured to perform a query optimization process on the query and to provide a notification to the client application when the query optimization process is complete, and wherein relinquishing computing resources for the second thread before the database management system acknowledges receiving the query comprises relinquishing the computing resources for the second thread before the database management system has completed the query optimization process.

11. The computer program product of claim 10, wherein the plurality of reactive programming operators further comprises a second query operator that when executed is configured to provide a second query to the database management system, and the query optimization process comprises:

allocating a third thread to execute the second query operator to provide the second query in the database management system, before executing the query operator using the second thread to provide the query to the database;

executing the second query operator using the third thread to provide the second query to the database; and relinquishing computing resources for the third thread before the database management system acknowledges receiving the second query.

12. The computer program product of claim 8, wherein the client application is configured to concurrently maintain a fixed number of threads, each thread associated with computing resources from one or more computers.

13. The computer program product of claim 8, wherein an allocated thread is a thread that has been previously allocated to execute an operator from the plurality of reactive programming operators and the computing resources for the allocated thread have been previously relinquished.

14. A computer-implemented method comprising:

receiving, from a client application, a request to execute a query on a database management system that maintains a database having one or more relations;

obtaining a plurality of reactive programming operators that implement an interface into the database management system, the operators comprising:

a database connection operator that when executed is configured to request a connection to the database, a query operator that when executed is configured to provide a query to the database management system, and a query result operator that when executed is configured to process one or more query results received from the database;

executing a reactive program to asynchronously, and without blocking, query and receive query results from the database management system, the executing comprising:

evaluating the reactive programming operators in the upstream subscription flow ordering until evaluating the database connection operator;

allocating a first thread to execute the database connection operator to request a connection to the database;

executing the database connection operator using the first thread to request a connection to the database;

relinquishing computing resources for the first thread before the database management system responds to the request for the connection;

receiving an indication that the database management system has provided a connection to the database;

in response, allocating a second thread to execute the query operator to provide the query to the database management system;

executing the query operator using the second thread to provide the query to the database;

relinquishing computing resources for the second thread before the database management system acknowledges receiving the query;

receiving an indication that the database management system has provided one or more first query results for the query;

in response, allocating a third thread to execute the query result operator to process the one or more first query results for the query; and executing the query result operator using the third thread to process the one or more first query results for the query.

15. The method of claim 14, wherein the database management system is configured to provide query results for the query in a plurality of batches including a first batch comprising the one or more first query results, and wherein the method further comprises:

relinquishing computing resources for the third thread after processing the one or more first query results for the query;

receiving an indication that the database management system has provided a second batch comprising one or more second query results for the query;

in response, allocating a fourth thread to execute the query result operator to process the one or more second query results for the query; and executing the query result operator using the fourth thread to process the one or more second query results for the query.

16. The method of claim 14, wherein the database management system is configured to perform a query optimization process on the query and to provide a notification to the client application when the query optimization process is complete, and wherein relinquishing computing resources for the second thread before the database management system acknowledges receiving the query comprises relinquishing the computing resources for the second thread before the database management system has completed the query optimization process.

17. The method of claim 16, wherein the plurality of reactive programming operators further comprises a second query operator that when executed is configured to provide a second query to the database management system, and the query optimization process comprises:

allocating a third thread to execute the second query operator to provide the second query in the database management system, before executing the query operator using the second thread to provide the query to the database;

executing the second query operator using the third thread to provide the second query to the database; and relinquishing computing resources for the third thread before the database management system acknowledges receiving the second query.

18. The method of claim 14, wherein the client application is configured to concurrently maintain more than ten thousand threads having connections to the database.

19. The method of claim 14, wherein the client application is configured to concurrently maintain a fixed number of threads, each thread associated with computing resources from one or more computers.

20. The method of claim 14, wherein an allocated thread is a thread that has been previously allocated to execute an operator from the plurality of reactive programming operators and the computing resources for the allocated thread have been previously relinquished.

* * * * *